(12) United States Patent
Bottome

(10) Patent No.: US 9,689,269 B2
(45) Date of Patent: Jun. 27, 2017

(54) LEADING EDGE PROTECTOR

(71) Applicant: ROLLS-ROYCE PLC, London (GB)

(72) Inventor: Kristofer John Bottome, Nottingham (GB)

(73) Assignee: ROLLS-ROYCE plc, London (GB)

( * ) Notice: Subject to any disclaimer, the term of this patent is extended or adjusted under 35 U.S.C. 154(b) by 296 days.

(21) Appl. No.: 14/596,455

(22) Filed: Jan. 14, 2015

(65) Prior Publication Data

US 2015/0218953 A1 Aug. 6, 2015

(30) Foreign Application Priority Data

Feb. 6, 2014 (GB) .................................. 1402022.6

(51) Int. Cl.
| | | |
|---|---|---|
| *F01D 5/28* | (2006.01) | |
| *F01D 5/14* | (2006.01) | |
| *F01D 9/04* | (2006.01) | |
| *F04D 29/28* | (2006.01) | |
| *F04D 29/32* | (2006.01) | |
| *F04D 29/54* | (2006.01) | |

(52) U.S. Cl.
CPC ............. *F01D 5/286* (2013.01); *F01D 5/147* (2013.01); *F01D 9/041* (2013.01); *F04D 29/289* (2013.01); *F04D 29/324* (2013.01); *F04D 29/542* (2013.01); *F05D 2220/36* (2013.01); *F05D 2240/121* (2013.01); *F05D 2240/303* (2013.01); *Y02T 50/672* (2013.01)

(58) Field of Classification Search
CPC ...................................................... F01D 5/286
USPC ......................................................... 416/224
See application file for complete search history.

(56) References Cited

U.S. PATENT DOCUMENTS

| 1,339,886 | A | * | 5/1920 | Heath | ................... B64C 11/205 416/224 |
|---|---|---|---|---|---|
| 1,404,849 | A | * | 1/1922 | Hamilton | ............... B64C 11/205 416/224 |
| 2009/0053067 | A1 | | 2/2009 | Schilling et al. | |
| 2009/0238686 | A1 | | 9/2009 | Lyders et al. | |
| 2011/0318181 | A1 | * | 12/2011 | Read | ......................... F01D 5/26 416/95 |

(Continued)

FOREIGN PATENT DOCUMENTS

| EP | 0 965 391 A1 | 12/1999 |
|---|---|---|
| EP | 2 022 942 A1 | 2/2009 |

(Continued)

OTHER PUBLICATIONS

Jun. 23, 2015 Search Report issued in European Application No. 15 15 0886.

(Continued)

*Primary Examiner* — Richard Edgar
(74) *Attorney, Agent, or Firm* — Oliff PLC

(57) ABSTRACT

A component of a gas turbine engine is provided. The component has a leading edge with two air-washed surfaces extending rearwardly therefrom to define opposing sides of the component. The component has a leading edge protector formed as a plurality of protector segments which succeed in a line along the leading edge. Each protector segment includes a sheath which covers the leading edge and the air-washed surfaces at regions adjacent the leading edge. Each protector segment overlaps with the neighboring sheath of the succeeding segment.

12 Claims, 4 Drawing Sheets

(56) References Cited

U.S. PATENT DOCUMENTS

2016/0010468 A1* 1/2016 Kray ................. B23P 15/04
                                                          415/200

FOREIGN PATENT DOCUMENTS

| JP | 61164002 A | * | 7/1986 |
| JP | S61-164002 A | | 7/1986 |
| JP | 2004-084524 A | | 3/2004 |
| JP | 2004084524 A | * | 3/2004 |
| WO | 2014/133546 A1 | | 9/2014 |

OTHER PUBLICATIONS

Sep. 25, 2014 Search Report issued in British Application No. 1402022.6.

* cited by examiner

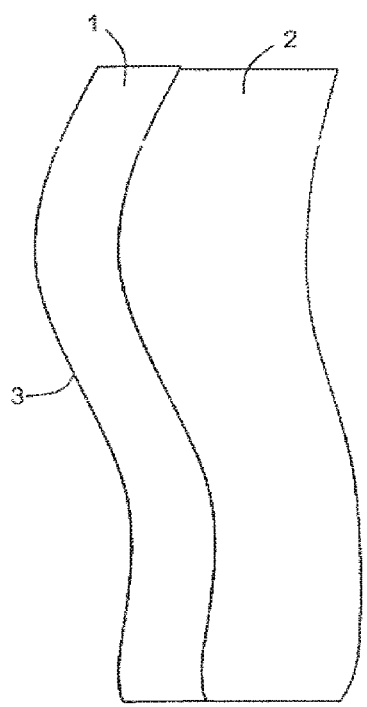
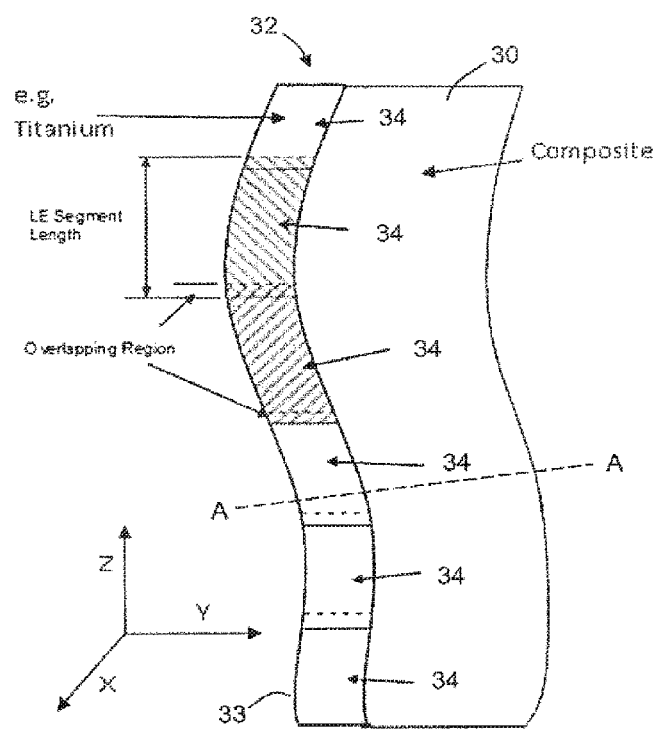
PRIOR ART
FIG. 2a
FIG. 2b

LEADING EDGE PROTECTOR

FIELD OF THE INVENTION

The present invention relates to a protector for a leading edge of a component of a gas turbine engine, such as an aerofoil component.

BACKGROUND OF THE INVENTION

Within gas turbine engines the leading edges of rotating and stationary aerofoils and of other components are subject to high levels of erosion and impact loading. In particular the fan blades and their subsequent guide vanes can experience harsh abrading environments including dust, sand, ice and water. They can also suffer impacts from foreign bodies such as birds and debris. Therefore the leading edges need to be sufficiently resistant to withstand such environments and impacts.

In respect of a metallic component, the metal of component itself may be sufficiently resistant, or a surface coating can be added that improves resistance. However, in general, polymer matrix composite materials, such as sometimes are used to form fan blades and guide vanes, are not sufficiently resistant to prevent erosion or impact damage. A particular danger is then that leading edge damage in components formed of these materials can grow into the more structural parts of the components.

One proposed solution is to wrap a metal sheath protector around the leading edge. This gives protection against erosion and impact damage, and makes it possible to dress back the leading edge.

When fixing a metal sheath protector at the leading edge it is usually necessary to apply respective surface treatments to the sheath and the component, and then to bond the two together. However, being bonded, the metallic leading edges have a tendency to detach during high energy impact events, and release from the component. This is especially an issue on rotating components, such as the fan blades. When a metal leading edge sheath protector releases from a fan blade it can form a high energy spear that can be difficult to contain in the engine casing, or, if directed forward, can cause a serious threat to the aircraft.

In addition, the shapes and tolerances required of metal leading edge sheath protectors can cause significant problems during manufacture. In particular, due to their complex form, pressing and rolling type manufacturing methods are difficult to control with sufficient accuracy. Machining operations are complicated by access issues to internal features of the parts. Welding can cause significant distortion problems due to the relative thinness and flexibility of the protectors.

SUMMARY OF THE INVENTION

Accordingly, in a first aspect, the present invention provides a component of a gas turbine engine, the component having a leading edge with two air-washed surfaces extending rearwardly therefrom to define opposing sides of the component;
  wherein the component has a leading edge protector formed as a plurality of protector segments which succeed in a line along the leading edge, each protector segment including a sheath which covers the leading edge and the air-washed surfaces at regions adjacent the leading edge, and which overlaps with the neighbouring sheath of the succeeding segment.

By the forming the leading edge protector from the plural protector segments, each segment can be made smaller than a conventional single-piece leading edge protector. Advantageously, each protector segment can be installed separately, facilitating the fitting of the complete protector and allowing individual protector segments to be replaced if damaged. The manufacturing tolerances required of each protector segment can generally also be less than the tolerances required of a conventional single-piece protector. Furthermore, in the event of a high energy impact event, smaller fragments will tend to be released.

On foreign body impact, an "impact" wave can propagate through the component (in the context of a fan blade, the wave can propagate down to the fan disc to reflect back towards the blade tip). A conventional single-piece protector does little to dampen this wave, but the protector segments of the present invention, by having overlapping sheaths, can act to dampen the wave by frictional dissipation between the sheaths.

Being formed of individual segments, the protector will also tend to be more flexible than a conventional single-piece protector. The component can thus itself flex without inducing excessive stresses at the bond interfaces between the segments and the component, reducing the risk of interfacial failure.

In a second aspect, the present invention provides a protector segment of the leading edge protector of the component of the first aspect.

Optional features of the invention will now be set out. These are applicable singly or in any combination with any aspect of the invention. In general, the sheath of each protector segment may be formed of a different material to the material of which the component is formed.

The sheath of each protector segment may be metallic. Metallic sheaths may be used, for example, with components formed of fibre reinforced plastic. However, metallic sheathes may also be used with metallic components. For example, aluminium components may have titanium sheathes.

The sheath of each protector segment may be formed of a polymer, such as a thermoplastic (e.g. PEEK or PPS) or a thermoset. The polymer may be a composite material, e.g. by reinforcing the polymer with embedded fibres or particulates. Polymeric sheaths may be used with components which are themselves formed of fibre reinforced plastic. For example, a carbon fibre reinforced plastic component may be protected with protector segments having sheaths formed of PEEK.

The number of protector segments, and accordingly the number of sheaths, is not particularly limited. In some applications, there may be as few as two, three or four protector segments, and in other applications there may be as many as ten or more, or twenty or more.

Each sheath may be thickened at the leading edge. In this way, the impact resistance of the protector can be improved.

The sheaths can be shaped to produce overlaps of differing extents and at differing locations. In particular, the configuration of the sheaths overlaps can be selected to optimise stress distributions and/or damping characteristics.

Conveniently, each protector segment may further include a former which defines the external shape of the component at the leading edge, the sheath of the protector segment wrapping around the former. The former may be produced of a different material to the sheath, for example the former may be produced of a polymer or a polymer matrix composite. Such a material can be formed e.g. by resin transfer moulding, compression or injection moulding, or resin infusion. However, other materials options for the former are possible. The former can be bullet-shaped on a cross-section through the component perpendicular to the leading edge, i.e. with the tip of the bullet at the leading edge. Spaced side plates of the sheath may extend rearwardly from the former over the air-washed surfaces of the component. Although the sheaths of neighbouring protector segments overlap, a clearance gap can be provided between the formers of succeeding protector segments. In this way, under impact, the formers can be prevented from hitting each other, and energy transmission along the leading edge through the formers can be reduced or avoided. The clearance gap can be filled with air, or a material having a lower density than the material of the formers, such as metallic or polymer foam, or rubber. More generally, the material filling the clearance gap can be any material that is capable of providing efficient damping (whether by elastic compression, friction or other means) between the formers.

The overlap between each pair of neighbouring sheaths can be produced by an insertion portion of one sheath which inserts inside an overlying portion of the other sheath. Conveniently, each sheath can have an insertion portion at one end thereof and an overlying portion at the other end thereof. This facilitates the use of a given protector segment at different positions along the leading edge. Each insertion portion can be formed by a reduced width region in which the distance between opposing sides of the respective sheath is decreased.

Sealant may be applied to the protector at the external joins between overlapping sheaths, the sealant smoothing the air-washed surfaces of the component across the joins. For example, the sealant may be a flexible material, such as polyurethane or polysulphide.

The component may be formed of composite material, such as fibre reinforced plastic (where the plastic can be e.g. epoxy or phenolic), a typical example being carbon-fibre reinforced plastic. However, the protector can also be usefully applied to components formed of other materials, such as metals.

The protector segments may be bonded to the component by paste adhesive (e.g. epoxy paste), film adhesive, or other suitable bonding system, depending on the given application.

The component may be an aerofoil component, the air-washed surfaces being the aerofoil suction and pressure surfaces. For example, the component may be a fan blade or a bypass duct outlet guide vane. However, the protector can be applied to non-aerofoil component components. For example, the component can be a splitter fairing for splitting air flow between a core of the engine and a bypass duct of the engine.

BRIEF DESCRIPTION OF THE DRAWINGS

Embodiments of the invention will now be described by way of example with reference to the accompanying drawings in which:

FIG. 2 shows schematically side views of (a) a conventional composite fan blade, and (b) a composite fan blade according to the present invention;

DETAILED DESCRIPTION AND FURTHER OPTIONAL FEATURES OF THE INVENTION

Figure 1:
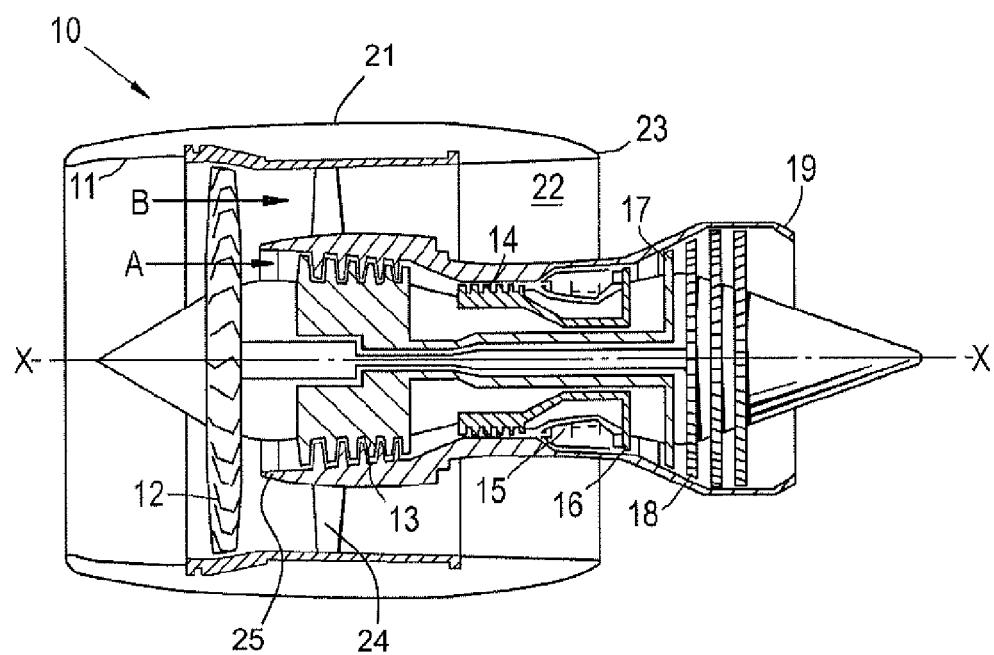
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23. The bypass duct 22 contains a row of outlet guide vanes 24.

During operation, air entering the intake 11 is accelerated by the fan 12 to produce two air flows: a first air flow A into the intermediate pressure compressor 13 and a second air flow B which passes through the bypass duct 22 to provide propulsive thrust. The two air flows A and B divide from each other at an annular splitter fairing 25. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

FIG. 2(a) shows schematically a side view of a conventional composite fan blade of for a gas turbine engine. The conventional blade has a composite main body 1 and a metallic one-piece leading edge protector 2, which extends from the root to the tip of the blade at the leading edge 3 thereof.

FIG. 2(b) shows schematically, by way of contrast, a side view of a composite fan blade according to the present invention. The blade may be installed in the fan 12 of the gas turbine engine 10 of FIG. 1. The blade has a composite main body 30, formed typically of carbon-fibre reinforced plastic, and a leading edge protector 32 which is formed from a plurality of protector segments 34 succeeding each other in a line along the leading edge 33 of the blade. The segments can be bonded to the composite main body by paste adhesive (e.g. epoxy paste) or film adhesive.

Figure 3:
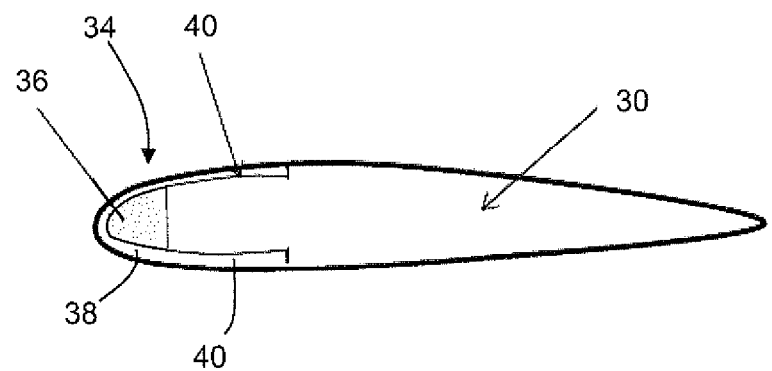
FIG. 3 shows schematically a cross-section through the blade along plane A-A of FIG. 2(b)

FIG. 3 shows schematically a cross-section through the blade along plane A-A of FIG. 2(b), which is perpendicular to the leading edge. Each segment 34 has a bullet-shaped former 36 which defines the external shape of the component at the leading edge. Wrapping around the former is a metallic (e.g. titanium) sheath 38 which provides the external surface of the segment at the leading edge and extends rearwardly as spaced side plates 40 over the pressure and suctions surfaces of the blade. The former can be made of plastic-based materials, and can be produced e.g. by resin transfer moulding, compression or injection moulding, or resin infusion. Other options, however, are to make the former of a thermoset matrix composite, a solid metal such as aluminium, a metallic honeycomb, or a syntactic foam.

Figure 4:
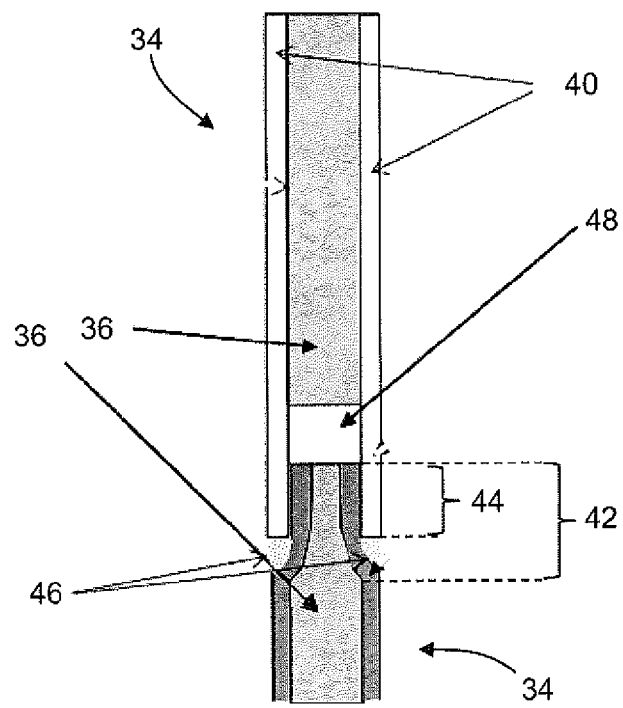
FIG. 4 shows schematically a view from the rear of two succeeding leading edge protector segments of the blade of FIG. 2(b), the view ignoring the composite main body of the blade.

FIG. 4 shows schematically a view from the rear of two succeeding segments 34 of the leading edge protector 32 of the blade of FIG. 2(*b*), the view ignoring the composite main body 30 of the blade. The neighbouring sheaths 38 of the segments overlap at the side plates 40 (the overlapping regions for the entire line of segments are also indicated in FIG. 2(*b*)). The overlap is produced by inserting an insertion portion 42 of one segment into an overlying portion 44 of the next segment. Generally, each segment has an insertion portion at one end and an overlying portion at the other end. The insertion portion can be formed by pinching the side plates 40 of the respective sheath so that the distance between the side plates is decreased, allowing the insertion to fit inside the overlying portion. The former 36 may also be reduced in width at the insertion portion.

Sealant 46 can be applied to the joins between the segments 34 in order to produce a smooth external air-washed surface. Suitable sealant can be a flexible material such as polyurethane or polysulphide.

The segmented leading edge protector 32 can help to reduce erosion of the fan blade. The segments 34 can also improve impact resistance. In particular, the joints between segments allow the protector to flex to a relatively high degree without releasing. In addition, the overlapping sheaths 38 of adjacent segments can help to frictionally dissipate the "impact" wave which travels through an impacted blade. Further, compared to a conventional single-piece leading edge protector, the segmented protector, if released, will generally produce smaller and lower energy fragments that are relatively easy to contain in the engine. The protector also allows replacement of single segments, facilitating repair of the blade. Related to this, as the protector is built up from the individual segments, the tolerances required to make each segment are less than those required to make a conventional single-piece protector.

A wave-stopping clearance gap 48 can be provided between the formers 36 of the succeeding segments 34. This helps to prevent the formers from hitting each other, and thereby reduces energy transmission along the leading edge when the blade undergoes an impact event. The gap can be air-filled, or filled with a damping material, such as metallic or polymer foam, or rubber.

Figure 5:
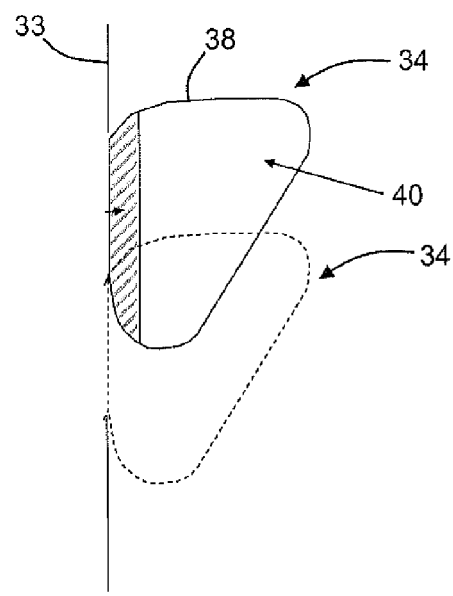
FIG. 5 shows schematically a side view of succeeding leading edge protector segments having a different side plate profile to that of the segments of FIGS. 2(b), 3 and 4.
Figure 6:
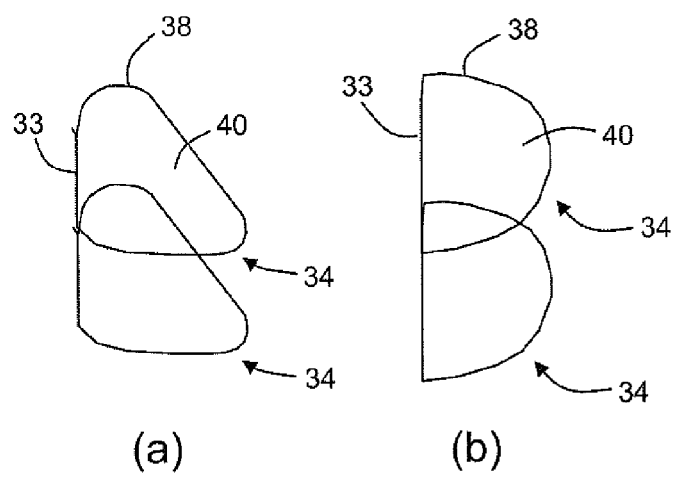
FIG. 6 shows schematically two side views (a) and (b) of succeeding leading edge protector segments having respective and further different side plate profiles.

The sheaths 38 of the segments 34 can be of various shape, e.g. with side plates 40 having rectangular profiles, as shown in the example of FIGS. 2(*b*), 3 and 4, or with cut-away side plates as shown in the side view of two adjacent segments 34 of FIG. 5. Varying the profile of the side plates 40 allows the degree and the location of the overlap between neighbouring sheaths to be adapted. In this way, the stress distribution in the protector 32 can be optimised for different applications. FIGS. 6(*a*) and (*b*) show side views of two adjacent segments 34 having different profiles for the side plates 40. Many other profiles are possible, however. As indicated by the shaded region in FIG. 5, the thickness of each sheath 38 can also be increased at the leading edge 33 to give extra impact resistance.

Although described above in respect of a composite blade, the segmented leading edge protector could also be applied to a blade formed of a different material, such as a metal. Moreover, the segmented leading edge protector could be applied to a different aerofoil component of the engine 10, such as the outlet guide vanes 24, or to a non-aerofoil component, such as the splitter fairing 25.

Also, although the segmented leading edge protector described above has metallic sheaths, other materials can be used for the sheaths, such as reinforced or unreinforced polymers (e.g. PEEK). In general, however, the sheath material is different to the material of which the main body of the component is formed.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A component of a gas turbine engine, the component having a leading edge with two air-washed surfaces extending rearwardly therefrom to define opposing sides of the component;
    wherein the component has a leading edge protector formed as a plurality of protector segments which succeed in a line along the leading edge, each protector segment including:
        a sheath which covers the leading edge and the air-washed surfaces at regions adjacent the leading edge, and which overlaps with the neighbouring sheath of the succeeding segment, and
        a former which defines the external shape of the component at the leading edge, the sheath of the protector segment wrapping around the former, wherein a clearance gap is provided between the formers of succeeding protector segments.

2. A component according to claim 1, wherein each sheath is thickened at the leading edge.

3. A component according to claim 1, wherein the former is bullet-shaped on a cross-section through the component perpendicular to the leading edge.

4. A component according to claim 1, wherein spaced side plates of the sheath extend rearwardly from the former over the air-washed surfaces of the component.

5. A component according to claim 1, wherein the overlap between each pair of neighbouring sheaths is produced by an insertion portion of one sheath which inserts inside an overlying portion of the other sheath.

6. A component according to claim 5, wherein each sheath has an insertion portion at one end thereof and an overlying portion at the other end thereof.

7. A component according to claim 5, wherein each insertion portion is formed by a reduced width region in which the distance between opposing sides of the respective sheath is decreased.

8. A component according to claim 5, wherein sealant is applied to the protector at the external joins between overlapping sheaths, the sealant smoothing the air-washed surfaces of the component across the joins.

9. A component according to claim 1, wherein each sheath of each protector segment is formed of a different material to the material of which the component is formed.

10. A component according to claim 1 which is formed of composite material.

11. A component according to claim 1 which is an aerofoil component, the air-washed surfaces being the aerofoil suction and pressure surfaces.

12. A component according to claim 1 which is a splitter fairing for splitting air flow between a core of the engine and a bypass duct of the engine.

* * * * *